United States Patent [19]

Takahashi

[11] 4,001,849

[45] Jan. 4, 1977

[54] PHOTOGRAPHIC CAMERA FOR USE WITH FILM CARTRIDGE

[75] Inventor: Tamotsu Takahashi, Tokyo, Japan

[73] Assignee: Copal Company Limited, Toyko, Japan

[22] Filed: Apr. 9, 1975

[21] Appl. No.: 566,430

[30] Foreign Application Priority Data

Apr. 11, 1974   Japan ............................. 49-41689

[52] U.S. Cl. ................................. 354/207; 354/213
[51] Int. Cl.² ....................................... G03B 17/42
[58] Field of Search .......... 354/207, 208, 209, 212, 354/213

[56] References Cited

UNITED STATES PATENTS

| | | | |
|---|---|---|---|
| 2,139,759 | 12/1938 | Lindenburg | 354/207 |
| 3,148,605 | 9/1964 | Peterson et al. | 354/213 |
| 3,532,040 | 10/1970 | Ehgartner et al. | 354/207 |
| 3,580,152 | 5/1971 | Engelsmann | 354/207 |
| 3,735,681 | 10/1971 | Galbraith, Jr. | 354/207 X |
| 3,776,114 | 12/1973 | Edwards | 354/213 |

*Primary Examiner*—L. T. Hix
*Assistant Examiner*—E. M. O'Connor
*Attorney, Agent, or Firm*—Cushman, Darby & Cushman

[57] ABSTRACT

A photographic camera of a type using film cartridges, comprising a sensing lever which can cooperate with a film contained in a film cartridge and a control lever engaged with said sensing lever so as to make a release button operatable only when the film has been completely wound up in case the cartridge is mounted on a camera body so that the operating stroke of the release button may be small and the structure may be simplified.

3 Claims, 4 Drawing Figures

PHOTOGRAPHIC CAMERA FOR USE WITH FILM CARTRIDGE

BACKGROUND OF THE INVENTION a. Field of the Invention

The present invention relates to photographic cameras of a type of using film cartridges, and more particularly to a device for preventing the double exposure and faulty winding up of a film in this type of camera.

b. Description of the Prior Art

In a conventional camera of this type, a member which will work to lock a release button when a film cartridge is mounted in a predetermined position on a camera body and to unlock the release button when the cartridge is taken out of the camera body, and a member which will work to unlock the release button when a film has been completely wound up and to lock the release button again when photographing ends are provided separately and therefore there have been defects that the structure is complicated and troubles are likely to occur and that the structure is so complicated as to be disadvantageous in making the camera small.

SUMMARY OF THE INVENTION

Therefore, a primary object of the present invention is to provide a photographic camera of a type of using film cartridges which is so formed that the locking and unlocking of a release button may be controlled by a single member cooperating with a film so that the structure may be simplified and no trouble may occur.

Another object of the present invention is to provide a photographic camera wherein the operating stroke of a release button is small and the release button can be lightly pressed.

These and other objects of the present invention will become more apparent during the course of the following detailed description and appended claims.

DESCRIPTION OF THE PREFERRED EMBODIMENT

Figure 1:
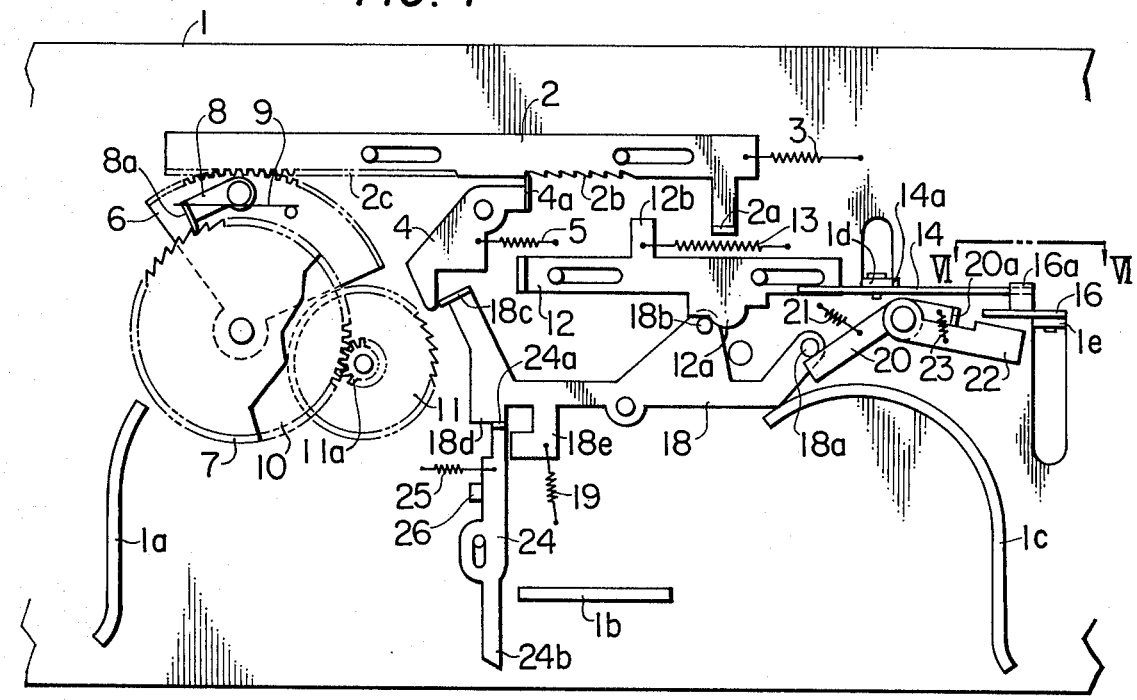
FIG. 1 is a plan view of a device embodying the present invention when no film cartridge is fitted.

Referring to the drawings, reference numeral 1 represents a base plate forming a part of a camera body having rising walls 1a, 1b and 1c for defining the fitting position of a later described film cartridge 27. Numeral 2 represents a cocking plate slidably mounted on said base plate 1 and having a bent portion 2a, ratchet teeth 2b and a rack portion 2c. Numeral 3 represents a spring pulling said cocking plate 2 rightward. Numeral 4 represents a lock lever rotatably supported on the base plate 1 and having a pawl portion 4a engageable with the ratchet teeth 2b. Numeral 5 represents a spring for biasing the lock lever 4 counterclockwise. Numeral 6 represents a sector gear rotatably supported on the base plate 1 and meshed with the rack 2c of the cocking plate 2. Numeral 7 represents a ratchet wheel rotatably supported on the base plate 1 and concentrically with the sector gear 6. Numeral 8 represents a ratchet lever rotatably supported on the sector gear 6 and having a pawl portion 8a engageable with the ratchet wheel 7. Numeral 9 represents a spring for biasing the ratchet lever counterclockwise. Numeral 10 represents a gear supported on the base plate 1 so as to be rotatable coaxially and integrally with the ratchet wheel 7. Numeral 11 represents a ratchet wheel rotatably supported on the base plate and having a pinion 11a meshing with the gear 10. Numeral 12 is a setting member slidably mounted on the base plate 1, having a cam surface 12a and a projection 12b which is located in the track of the bent portion 2a of the cocking plate 2 and arranged so as to be engageable at the left end with the lock lever 4. Numeral 13 represents a spring pulling the setting member 12 rightward. Numeral 14 represents a lock lever rotatably supported on a bracket 1d raised from the base plate 1, having a pin 14a which can contact said bracket 1d and arranged so as to be engageable at one end with the right end of the setting member 12. Numeral 15 (in FIG. 4) represents a spring for biasing the lock lever 14 clockwise in FIG. 4. Numeral 16 represents a release member mounted slidably vertically in FIG. 4 on a bracket 1e raised from the base plate 1 as clearly shown in FIG. 4 and having a bent portion 16a engageable with the lock lever 14. Numeral 17 (in FIG. 4) represents a spring for biasing said release member 16 upward in FIG. 4. Numeral 18 represents a control lever rotatably supported on the base plate 1 and having a pin 18a, pin 18b engaging with the cam surface 12a of the setting member 12, ratchet portion 18c engageable with the ratchet wheel 11, end surface 18d and hook portion 18e. Numeral 19 represents a spring for biasing the control lever 18 counterclockwise. Numeral 20 represents a lock control lever rotatably supported on the base plate 1, engaging in one end portion with a pin 18a of the control lever 18 and having a bend 20a formed in the other end portion. Numeral 21 represents a spring for biasing said lock control lever 20 clockwise. Numeral 22 represents a lock member rotatably supported on the base plate 1 and concentrically with the lock control lever 20 and locatable at one arm end in the moving track of the release member. Numeral 23 represents a spring connected between the lock control lever 20 and lock member 22. Numeral 24 represents a sensing lever supported slidably and rotatably on the base plate 1, having in one end portion a bend 24a engageable alternately with the end surface 18d and hook portion 18e of the control lever 18 and formed in the other end portion to be like a knife edge. Numeral 25 represents a spring for biasing said sensing lever 24 counterclockwise. Numeral 26 represents a stopper fixed on the base plate 1 so as to limit the counterclockwise rotation of the sensing lever 24. Numeral 27 represents a well known cartridge which can be fitted in a predetermined position on the base plate 1 by the walls 1a, 1b and 1c as shown by the chain line in FIG. 3 and has an unexposed film containing portion 27a, film guiding portion 27b and exposed film containing portion 27c. Numeral 28 represents a film contained in the film cartridge 27, having well known perforations 28a engageable with the knife-shaped tip portion 24b of the sensing lever 24 formed on the side edges and fixed at one end to a shaft 27a' set rotatably in the center portion of the containing portion 27a and at the other end to a shaft 27c' set rotatably in the center portion of the containing portion 27c. Numeral 29 represents a film winding gear secured to the rotary shaft 27c' projected out of the film cartridge 27 and engageable with the gear 10 when the film cartridge 27 is mounted in the position in FIG. 3. In the above mentioned device, the spring 5 biasing the lock lever 4 counterclockwise is stronger than the spring 3 biasing the cocking plate 2 rightward. Further, the operating stroke of the cocking plate 2 and the gear ratio of the sector gear 6 or gear 10 and the film winding gear 29 are so designed that, when the cocking plate 2 moves from the position in FIG. 1 to the position in FIG. 3, the film 28 may be wound up by one frame within the film cartridge 27.

The operation of the above mentioned device shall be explained in the following.

Figure 2:
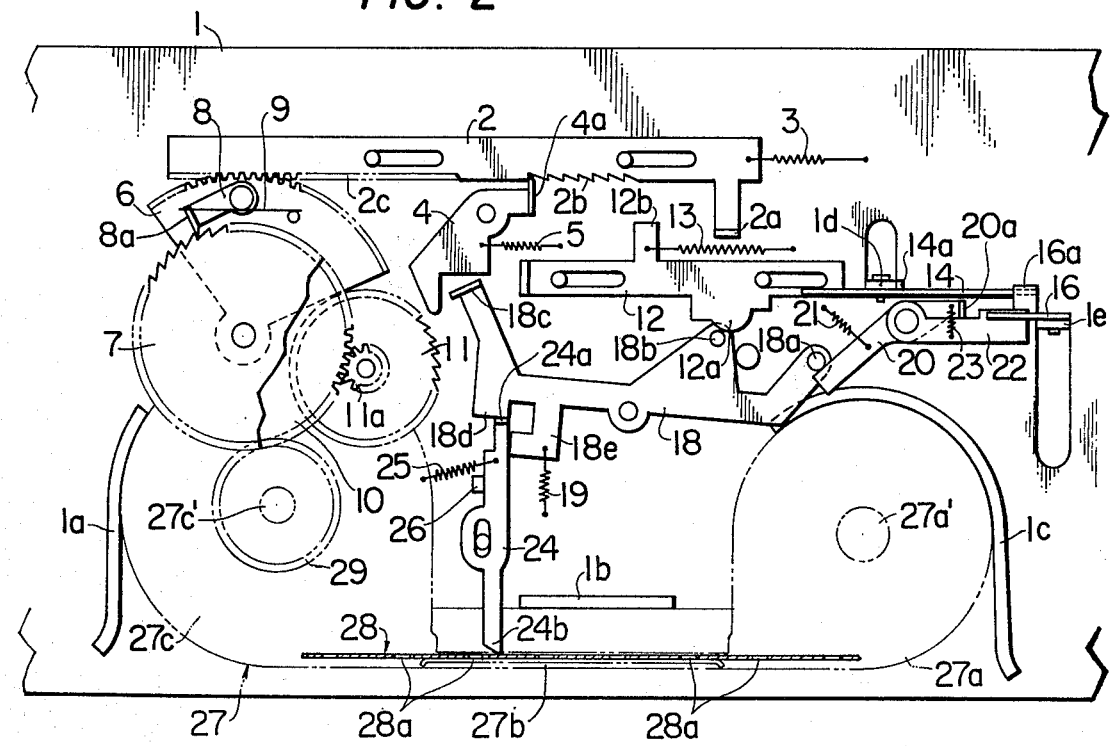
FIG. 2 is the same plan view as FIG. 1 when a film cartridge is fitted.

FIG. 1 shows the case that the film cartridge 27 is not mounted on the base plate 1 and the device is not cocked. When the film cartridge 27 is mounted on the base plate 1 as shown in FIG. 2 in this state, the part of the film 28 present within the film guiding portion 27b of the film cartridge 27 will push the tip portion 24b of the sensing lever 24 to move the sensing lever 24 upward. By this movement of the sensing lever 24, the control lever 18 will be rotated clockwise against the spring 19 from the position in FIG. 1 to the position in FIG. 2 and, at the same time, the lock control lever 20 will be rotated counterclockwise against the spring 21. As a result, the lock member 22 will be rotated counterclockwise from the position in FIG. 1 to the position in FIG. 2 so that the tip portion may enter the track of the release member 16. Therefore, the release member 16 will be locked so as to be unable to be pushed.

Figure 3:
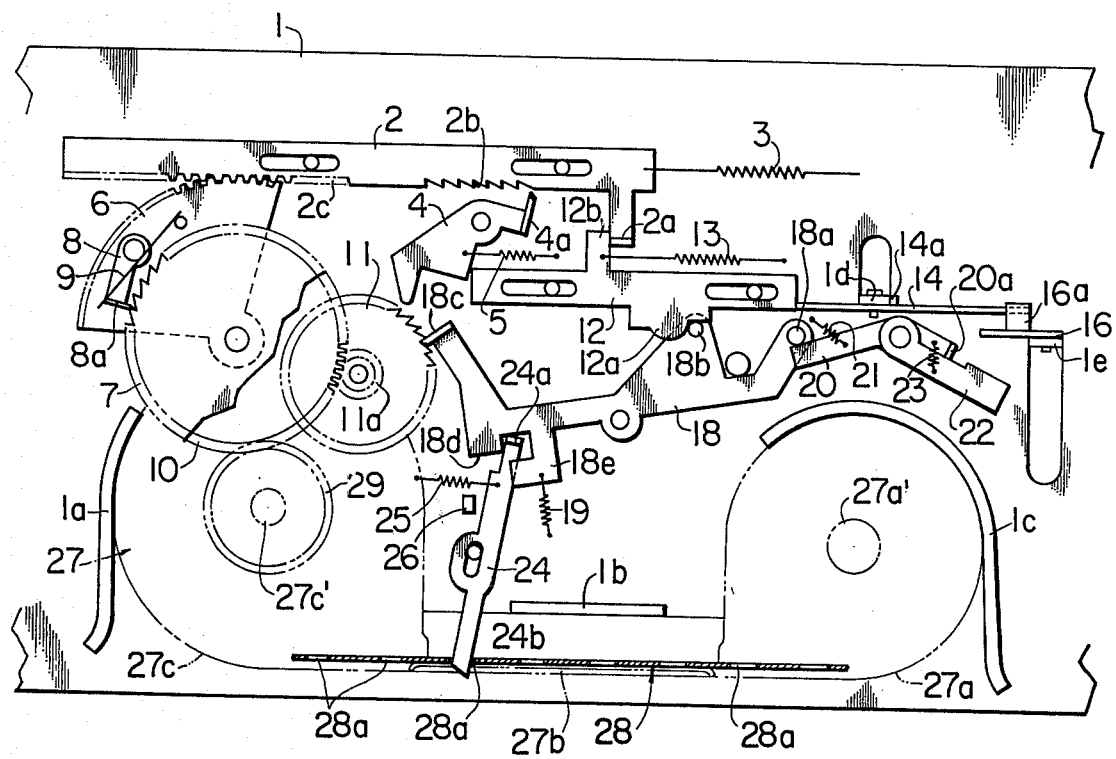
FIG. 3 is a plan view when a film has been completely wound up.

After the film cartridge 27 is thus mounted, when the cocking plate 2 is moved leftward by operating a film winding lever provided on camera body not illustrated, first the sector gear 6 will be rotated counterclockwise. In such case, the pawl portion 8a of the ratchet lever 8 will be kept engaged with the tooth of the ratchet wheel 7 and therefore, with the counterclockwise rotation of the sector gear 6, the ratchet wheel 7 will be rotated also counterclockwise and the gear 10 will be also rotated counterclockwise integrally with it. Therefore, the ratchet wheel 11 and film winding gear 29 will be also rotated clockwise at the same time and the film 28 contained in the film cartridge 27 will be wound up by the shaft 27c' and therefore will be moved leftward within the film guiding portion 27b. While the cocking plate 2 is moving leftward, the bent portion 2a will contact the projection 12b of the setting member 12 and will move said member leftward against the spring 13. In the case of this movement of the setting member 12, the cam surface 12a will pass over the pin 18b of the control lever 18 and therefore said control lever 18 will be rotated slightly clockwise. When the cam surface 12a passes over the pin 18b, the control lever 18 will return to the position in FIG. 2. When the cocking plate 2, that is, the setting member 12 has moved leftward by a predetermined stroke, the film 28 will be wound up by one frame, the tip portion 24b of the sensing lever 24 will engage in the corresponding perforation 28a and, on the other hand, the lock lever 14 will engage at the left end with the right end of the setting member 12 so that the setting member 12 may be locked in the position in FIG. 3. After the tip of the tip portion 24b of the sensing lever 24 engages in the perforation 28a of the film 28 as described above, the sensing lever 24 will be rotated clockwise against the spring 25 in the final step of the movement of said film 28 by one frame and therefore the bent portion 24a will disengage from the end surface 18d of the control lever 18. Therefore, the control lever 18 will be rotated counterclockwise by the spring 19, the pin 18a will release the pressing of the lock control lever 20, the pin 18b will come to be positioned on the right side of the cam surface 12a and the ratchet portion 18c will engage with the ratchet wheel 11 and will lock the gears 11a and 10 and ratchet wheel 7. The control lever 18 in this state is shown in FIG. 3. On the other hand, when the pressing is released by the pin 18a, the lock control lever 20 will rotate clockwise following the counterclockwise rotation of the control lever 18 and, at the same time, the lock member 22 will be also rotated clockwise and will retreat from the track of the release member 16. By the way, when the setting member 12 has moved leftward by the predetermined stroke, that is, when the film 28 has been wound up by one frame, the lock lever 4 will be rotated clockwise by the setting member 12, the pawl portion 4a will be disengaged from the ratchet tooth 2b of the cocking plate 2, therefore, the cocking plate 2 will be returned to the position in FIGS. 1 and 2 by the spring 3, at the same time, the ratchet lever 8 will idle for the ratchet wheel 7 and therefore the sector gear 6 will also rotate clockwise to return to the position in FIGS. 1 and 2. The film 28 contained in the film cartridge 27 will be completely wound up as described above. In this process, a shutter not illustrated will be also cocked.

Figure 4:
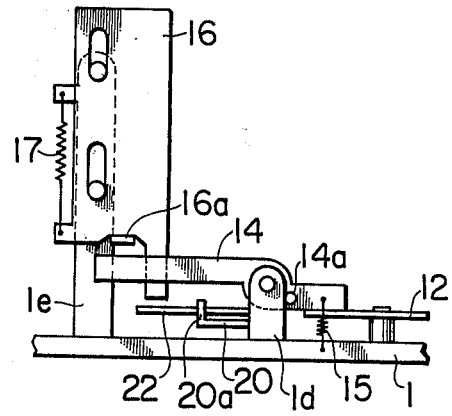
FIG. 4 is a partial side view as seen on line IV — IV in FIG. 1.

When the release member 16 is pushed down in this state, the lock lever 14 will be rotated counterclockwise in the position in FIG. 4 by the bent portion 16a and will therefore disengage at the left end from the right end of the setting member 12. Therefore, the setting member 12 will be returned to the position in FIG. 2 from the position in FIG. 3 by the spring 13. Therefore, the lock lever 4 will be returned to the position in FIG. 2. At this time, the cam surface 12a will push the pin 18b, therefore the control lever 18 will be rotated clockwise against the spring 19, the pin 18a will rotate the lock control lever 20 counterclockwise, the ratchet portion 18c will disengage from the ratchet wheel 11 and the hook portion 18e will engage with the bent portion 24a of the sensing lever 24 to pull said sensing lever 24 upward and disengage the tip portion 24b from the perforation 28a of the film 28. Therefore, at the same time as the tip portion 24b disengages from the perforation 28a, the sensing lever 24 will be rotated counterclockwise by the spring 25 until it contacts the stopper 26, the end surface of the tip portion 24b will come into contact with the film part in which the perforation 28a is not present, the bent portion 24a will contact the end surface 18d of the control lever 18 and said control lever 18 will be stationary in the position in FIG. 2. With the counterclockwise rotation of the lock control lever 20, the lock member 22 will again enter the track of the release member 16. When the film cartridge 27 is taken out of the base plate 1 in this state, the sensing lever 24 will move to the position in FIG. 1 from the position in FIG. 2 and, at the same time, the control lever 18 will also rotate slightly counterclockwise. Therefore, the lock member 22 will again deviate out of the track of the release member 16 so that the release member 16 may be pressable.

As evident from the above explanation, in any case, unless the film 28 within the film cartridge 27 is in the right winding position, the release member 16, that is, the shutter button will not be able to be pressed. Therefore, the double exposure and faulty winding up of the film can be perfectly prevented.

I claim:

1. A photographic camera for the use of film cartridges comprising:
   a base plate,
   a setting member slidably mounted on said base plate and moved between its uncocked position and its cocked position,
   a control lever pivotally mounted on said base plate and engaged with said setting member,
   a sensing lever slidably and rotatably mounted on said base plate and engaged with said control lever,
   a film cartridge capable of being mounted on said base plate and containing a film having perforations engageable with said sensing lever,
   a lock member rotatably mounted on said base plate and operatively connected with said control lever, and
   a release member movably mounted on said base plate and engageable with said lock member,
   said release member being disposed and constructed for movement to return said setting member from its cocked position to its uncocked position only when said sensing lever engages with one of said perforations of said film, and
   said sensing lever being disposed and constructed for disengagement from one of said perforations by said control lever when said setting member returns to its uncocked position from its cocked position.

2. A photographic camera according to claim 1, in which said sensing lever has a tip portion formed as a knife-edge and engageable with one of said perforations.

3. A photographic camera according to claim 1, in which said camera further comprises a gear rotatably mounted on said base plate and capable of being rotated in association with the movement of said setting member from its uncocked position to its cocked position in order to wind up said film, and a ratchet wheel mounted rotatably on said base plate and meshed with said gear and engageable with said control lever, said ratchet wheel being arranged so as to be stepped by said control lever when said film has been wound up by one frame.

* * * * *